April 23, 1929.  E. A. BOLE  1,710,605
CONVEYER SCREEN
Filed March 26, 1928   4 Sheets-Sheet 1

Inventor:
E. A. Bole
By
Attorney

April 23, 1929.  E. A. BOLE  1,710,605
CONVEYER SCREEN
Filed March 26, 1928  4 Sheets-Sheet 2
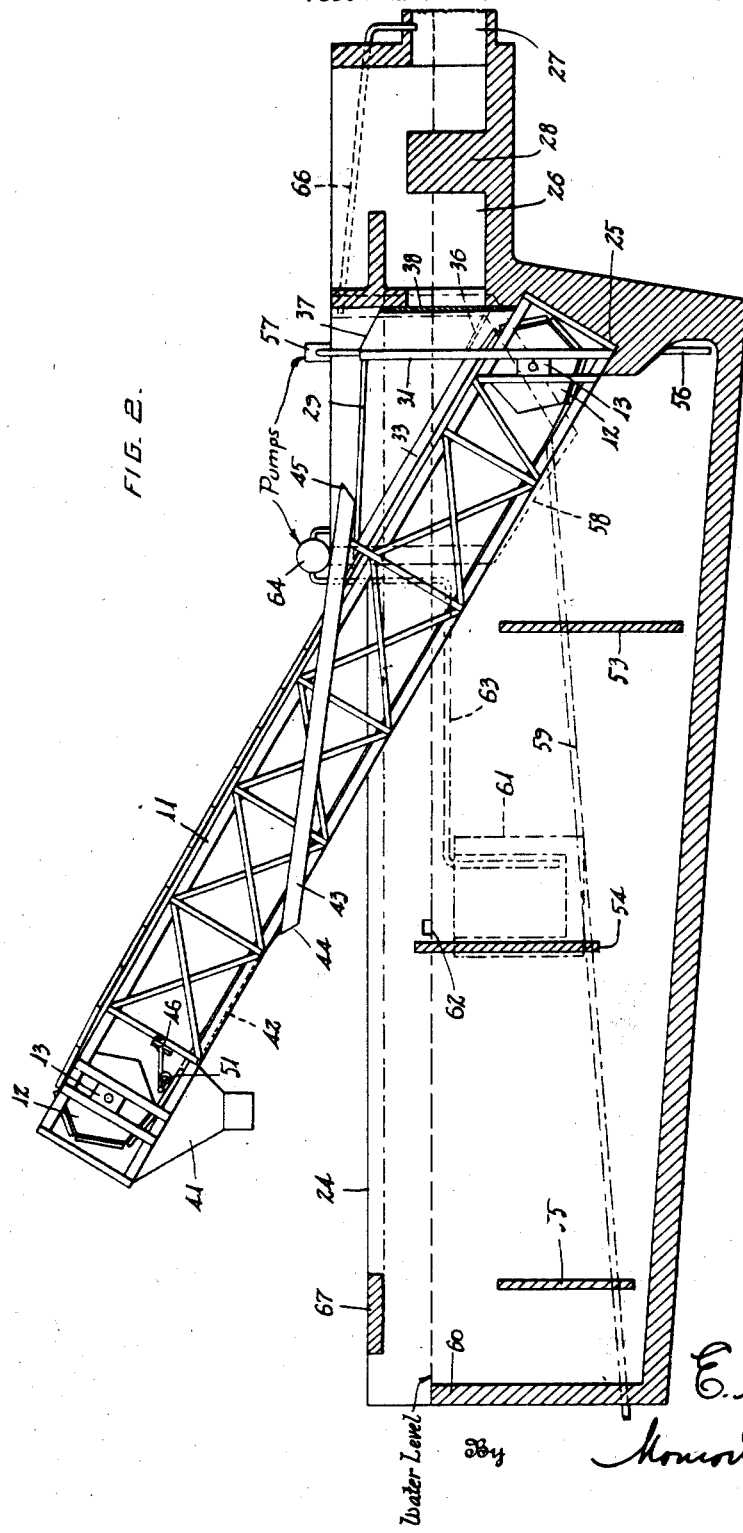
FIG. 2.

April 23, 1929.   E. A. BOLE   1,710,605
CONVEYER SCREEN
Filed March 26, 1928    4 Sheets-Sheet 3
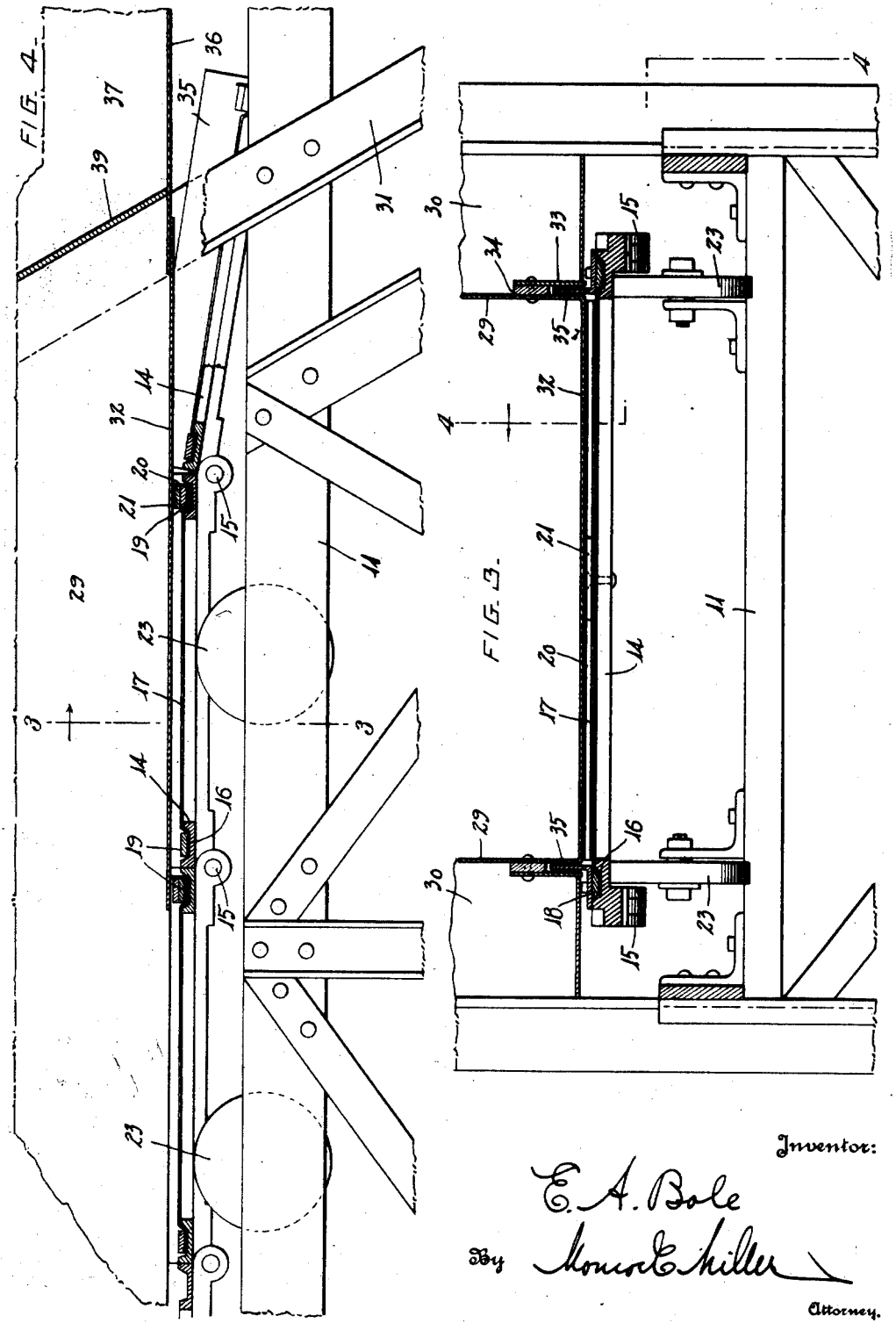
Inventor:
E. A. Bole
By Monroe E. Miller
Attorney.

April 23, 1929.  E. A. BOLE  1,710,605
CONVEYER SCREEN
Filed March 26, 1928  4 Sheets-Sheet 4

Inventor:
E. A. Bole
By Monro E. Miller
Attorney

Patented Apr. 23, 1929.

1,710,605

UNITED STATES PATENT OFFICE.

EDWARD A. BOLE, OF LONG BEACH, CALIFORNIA.

CONVEYER SCREEN.

Application filed March 26, 1928. Serial No. 264,831.

The present invention relates to apparatus for screening material, such as for the separation of solid matter from sewage, and the invention aims to provide a novel and improved apparatus of that kind.

Another object of the invention is the provision of a novel and improved conveyer screen structure, having improved features of construction to increase the efficiency of the apparatus.

Another object of the invention is the provision of a sewage separation plant having novel features of construction to increase the efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a vertical section on the line 2—2 of Fig. 1.

Fig. 3 is a cross section of one of the conveyer screen units, taken on the line 3—3 of Fig. 4.

Fig. 4 is a fragmentary longitudinal section of the conveyer screen unit, taken on the line 4—4 of Fig. 3.

Figure 1:
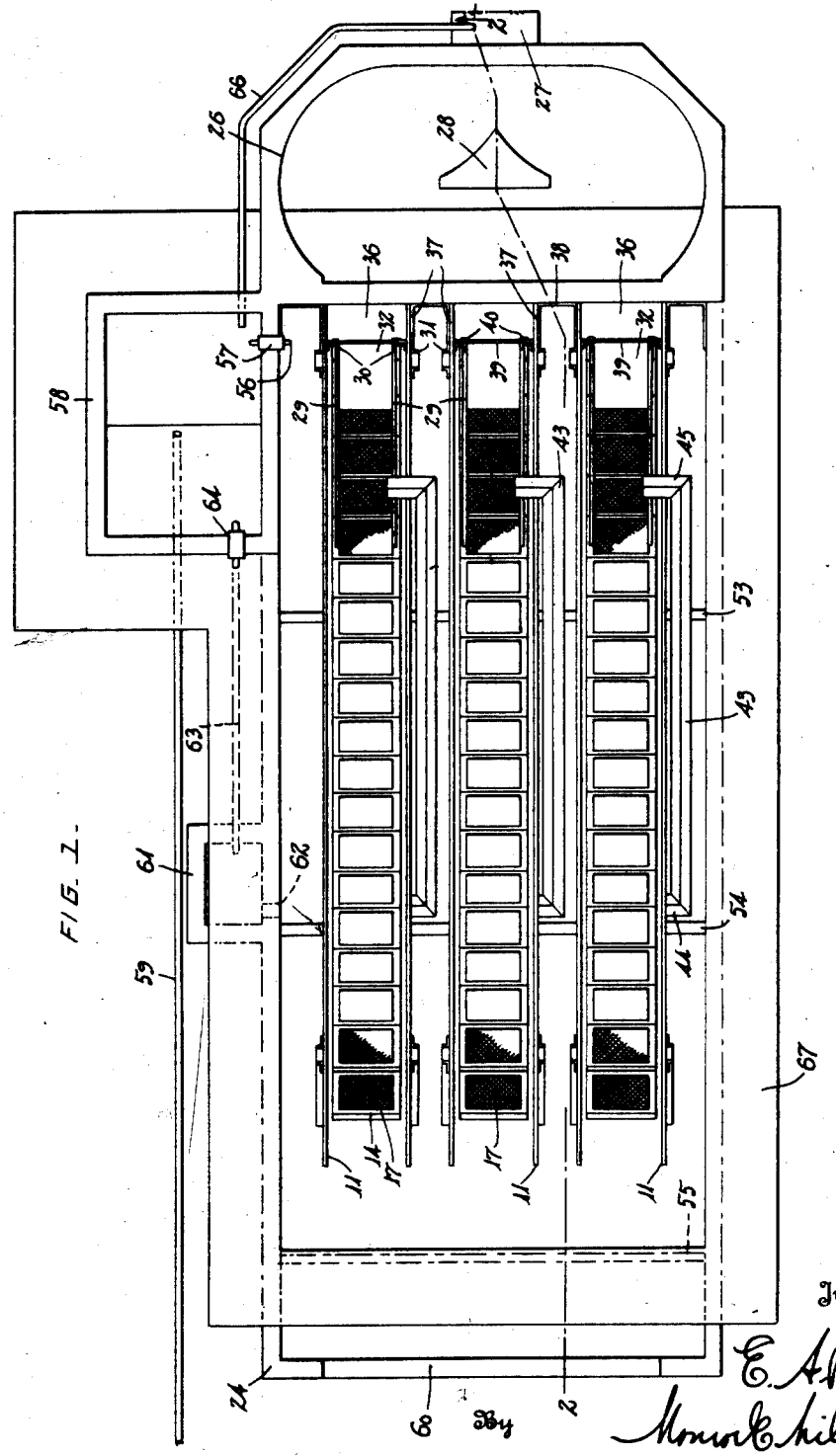
Figure 1 is a plan view of the sewage separation plant embodying the improvements.

The sewage separation plant shown has three conveyer units disposed side by side, as seen in Fig. 1, and each of these units comprises an inclined frame 11 having the drums 12 in the upper and lower end portions thereof, with their axles mounted in bearings 13, which are preferably adjustable. The drums are of polygonal shape to accommodate the screen frames 14 which are hingedly connected, as at 15, to constitute the conveyer chain. The screen frames 14 are of suitable metal, and in their outer surfaces are provided with the grooves 16 adjacent to their marginal edges. Each frame has a central opening surrounded by said grooves, and a screen panel 17 of suitable mesh is placed across the opening, and its edge portions are pressed within the grooves 16 of the frame. Strips 18 and 19 extending longitudinally and transversely of the conveyer, respectively, are disposed in the grooves 16 to clamp the edge portions of the screen panel therein, and are fastened by bolts or screws to the frame 14.

An angle iron scraper 20 is provided for each frame 14, with one flange clamped below the rear strip 19, and the other flange projecting outwardly at the rear of said strip, and a guard piece 21 is secured on said strip 21 in front of the outstanding flange of the scraper 20 to protect it when encountering fixed parts of the structure as the frame moves in its circuit.

The drums 12, preferably the upper drum of each conveyer, have angle pieces 22 which close the spaces between the screen frames 14, when said frames are swung relatively to one another in passing around the drums 12. This prevents solid matter from dropping between the frames 14 when passing over the upper drum 12.

The upper run of the conveyer moves on rollers 23 mounted in the frame 11, as seen more clearly in Figs. 3 and 4, and the frames 14 may move on the bottom of the conveyer frame 11 at the lower run.

The lower portions of the conveyer units are disposed within a basin 24 constructed of concrete or any suitable material, and having an abutment 25 against which the lower ends of the frames 11 abut. The basin has an entrance chamber 26 in front of the conveyers, into which the sewage flows from a pipe or conduit 27, and a deflector or spreader 28 rises from the bottom of the chamber to deflect the sewage so as to spread it across the mouths of the conveyer units.

Each conveyer unit is provided at the receiving end thereof with side plates 29 mounted above the upper runs of the conveyer. Said plates 29 are secured by spacers 30 to uprights 31 of the frame 11. The plates 29 of each pair are connected at their lower edges by plates 32 under which the screen frames 14 move when starting upwardly from the lower drum 12, as seen in Fig. 4. The plate 32 has its upper edge terminating short of the upper edges of the plates 29, and below the water level of the basin and the liquid flows between the plates 29 and over the plate 32 to the conveyer. The scrapers 20 scrape along the lower surface of the plate 32, thereby preventing the solid matter from passing downwardly between the conveyer and said plate 32.

Apron strips 33 are secured to the opposite sides of the side plates 29 by spacer bars 34, and flanges or angle irons 35 are secured on the strips 18 of the screen frames 14 so as to pass between the plates 29 and strips 33, to prevent the solid matter from passing outwardly under the lower edges of the plates 29.

Threshold plates 36 extend from the bottom of the chamber 26 and overlap the plates 32 to direct the liquid and solid matter from the chamber 26 over the plates 36 and 32 to the conveyers, and the spaces between the plates 29 of the conveyer units are closed by partitions 37 and 38, so that sewage is compelled to flow to the conveyers. Control gates 39 are slidable in guides 40 carried by the spacers 30, to control the flow of liquid to the conveyers, said gates being slidable vertically in the mouths of the conveyers.

Hoppers 41 are supported in any suitable manner below the upper drums 12 of the conveyers to receive the solid matter discharged from the conveyers, and to deliver same into suitable receptacles. Drip pans 42 extend downwardly along the bottom portions of the frames 11 from the hoppers 41, and discharge into troughs 43 which have their upper terminals 44 extending under the lower edges of the pans 42, and the lower ends 45 of said troughs extend over the corresponding plates 29 to return the drippings from the conveyer back to the lower portions of the conveyers.

Figure 5:
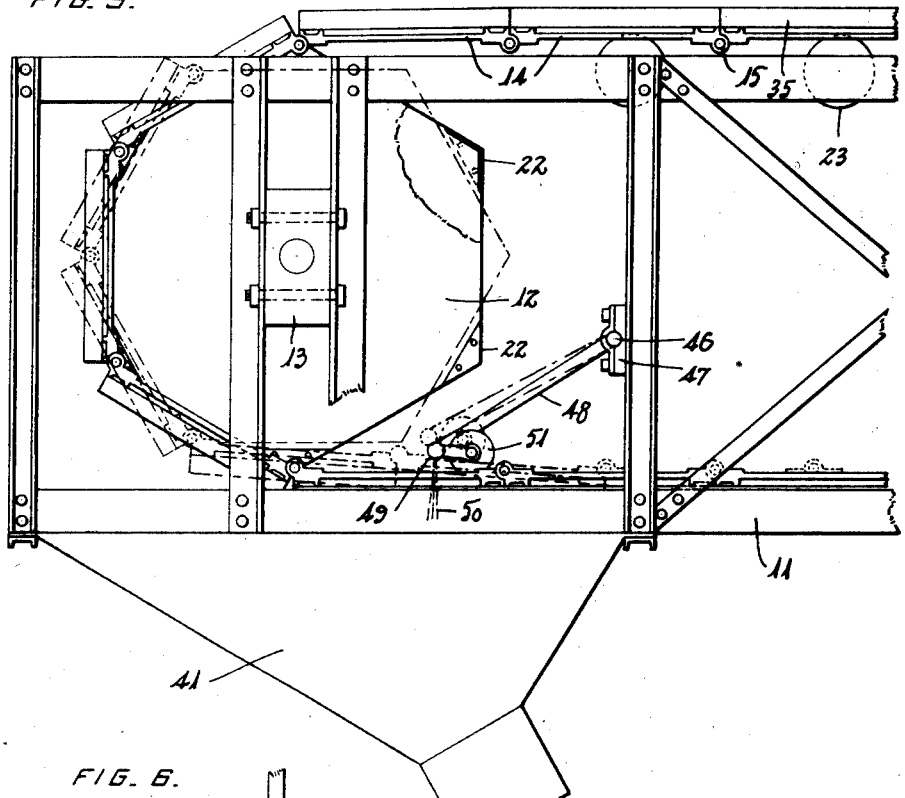
Fig. 5 is a side elevation of the upper end portion of one of the conveyer screen units, showing the drum and conveyer in one position in full lines, and in another position in broken lines, portions being broken away and shown in section.
Figure 6:
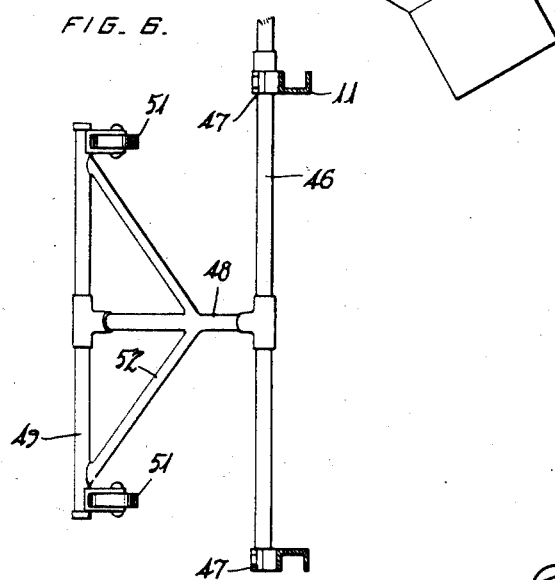
Fig. 6 is a plan view of the fluid discharging device.

Each conveyer is provided with means for dislodging the solid matter from the screens. Said means includes a transverse pipe 46 mounted for turning movement in bearings 47 on the frame 11 adjacent to the upper drum 12, and compressed air or other pressure fluid is supplied into said pipe from any suitable source. The pipe 46 has an arm 48 with a transverse discharge head 49 for directing streams or jets of the fluid downwardly through the screens 17 as they move over the hopper 41, as seen in Fig. 5, as at 50. The head 49 may move upwardly and downwardly with the oscillatory arm 48, and the head 49 has wheels 51 adapted to roll on the screen frames 14 along the same lines of contact as those of the rollers 23. This will maintain the spray head 49 at the same distance above the screens even though the screen frames have vertical motion above the hopper 41 due to the polygonal form of the drum 12. The pressure of the streams 50 is therefore maintained uniform with reference to the screens.

The head 49 may also be maintained close to the screens. As shown, a single arm 48 is used between the pipe 46 and head 49, with braces 52, although a plurality of arms 48 may be used.

Baffles 53, 54 and 55 are disposed within the basin 24 in rear of the conveyers, and their lower edges are spaced above the bottom of the basin which slopes forwardly to a point below the forward or lower ends of the conveyers, so that sediment may gravitate to the forward end of the basin, from which the sand and other sediment is pumped up through a pipe 56, by means of a pump 57. The central baffle 54 extends above the liquid level, compelling the liquid as well as solid matter to flow under said baffle, so that said baffle arrests the lighter material. The baffles 53 and 55 terminate below the water level, and the basin 24 has a wier 60 at its rear end over which the liquid discharges.

The basin 24 has a tank 58 at one side into which the pipe 56 discharges, and a drain pipe 59 extends from the bottom of the tank 58 for the discharge of sand and other heavier matter.

At one side of the basin 24 is a chamber 61 to receive the lighter material which discharges through an opening or outlet 62 in said side of the basin in front of the baffle 54, so that oil and other lighter materials are discharged through the opening 62 into said chamber, from which they are pumped through a pipe 63 by a pump 64 and discharged into the tank 58. An overflow pipe 66 extends from the mouth of the chamber 58 into the conduit 27, for delivering the overflow and the lighter materials at the surface of the liquid in said tank back into the chamber 26 to return to the conveyers.

The liquid flows from the chamber 26 to the conveyers, so that the screens 17 arrest the solid matter, and the conveyers are actuated by a suitable motor or engine, so that the solid matter is carried upwardly on the upper runs of the conveyers. The solid matter drops from the screens into the hoppers 41, assisted by the discharge of compressed air or other pressure fluid downwardly through the screens.

The basin 24 is preferably constructed with a sidewalk or runway 67 surrounding the conveyer screens on which attendants may stand.

Having thus described the invention, what is claimed as new is:—

1. A conveyer having screens, and fluid discharge means discharging through the screens mounted for movement toward and away from the conveyer and contacting with the conveyer to be maintained in a predetermined spaced relation with the screens.

2. A conveyer having screens mounted for circuitous movement, and oscillatory fluid discharge means discharging through the screens and having portions contacting with the conveyer to maintain said means in a predetermined spaced relation with the screens.

3. A conveyer comprising polygonal drums, hingedly connected frames movable in a circuit around said drums and each having a screen, and fluid discharge means movably mounted adjacent to one drum to discharge through said screens, said means contacting with the screen frames to be maintained in a predetermined spaced relation with the screens.

4. A conveyer composed of hingedly connected frames having screen panels, means for mounting said conveyer for circuitous movement, and a mouth for the conveyer comprising side plates between which liquid flows to the conveyer and a plate connecting said side plates and over which the liquid flows, said screens moving under the last-named plate, and said frames having scrapers at their rear portions working along the lower surface of the last-named plate.

5. A conveyer composed of hingedly connected frames having screen panels, means for mounting said conveyer for circuitous movement, and a mouth for the conveyer comprising side plates between which liquid flows to the conveyer and a plate connecting said side plates and over which the liquid flows, said screen moving under the last named plate and said frames having scrapers working along the lower surface of the last named plate.

In testimony whereof I hereunto affix my signature.

EDWARD A. BOLE.